(12) United States Patent
Sakaue et al.

(10) Patent No.: US 10,255,675 B2
(45) Date of Patent: Apr. 9, 2019

(54) MEDICAL IMAGE PROCESSING APPARATUS AND ANALYSIS REGION SETTING METHOD OF TEXTURE ANALYSIS

(71) Applicant: TOSHIBA MEDICAL SYSTEMS CORPORATION, Otawara-shi (JP)

(72) Inventors: Kousuke Sakaue, Nasushiobara (JP); Hitoshi Yamagata, Otawara (JP)

(73) Assignee: TOSHIBA MEDICAL SYSTEMS CORPORATION, Otawara-shi (JP)

(*) Notice: Subject to any disclaimer, the term of this patent is extended or adjusted under 35 U.S.C. 154(b) by 54 days.

(21) Appl. No.: 15/375,485

(22) Filed: Dec. 12, 2016

(65) Prior Publication Data

US 2017/0213347 A1 Jul. 27, 2017

(30) Foreign Application Priority Data

Jan. 25, 2016 (JP) .................. 2016-011476
Sep. 29, 2016 (JP) .................. 2016-191730

(51) Int. Cl.
*G06K 9/00* (2006.01)
*G06T 7/00* (2017.01)

(52) U.S. Cl.
CPC .. *G06T 7/0012* (2013.01); *G06T 2207/10081* (2013.01); *G06T 2207/30064* (2013.01)

(58) Field of Classification Search
CPC ......... G06T 7/0012; G06T 2207/10004; G06T 2207/10024; G06T 2207/10068; G06T 2207/10081; G06T 2207/10088; G06T 2207/10116; G06T 2207/10132; G06T 2207/20021; G06T 2207/20041; G06T 2207/30028; G06T 2207/30064; G06T 7/40; G06T 7/41; G06F 19/321; G06K 2209/053; G06K 9/4604; G06K 9/522; G06K 9/6277; A61B 2090/374; A61B 2090/3762; A61B 2090/378; A61B 2576/00; A61B 5/0013
See application file for complete search history.

(56) References Cited

U.S. PATENT DOCUMENTS

| 6,154,560 A * | 11/2000 | Cothren ................ G06T 7/0012 382/128 |
| 9,275,457 B1 * | 3/2016 | Chen ........................ G06T 7/11 |
| 2003/0215119 A1 | 11/2003 | Uppaluri et al. |
| 2008/0205717 A1 * | 8/2008 | Reeves ................ G06T 7/0012 382/128 |
| 2011/0229005 A1 * | 9/2011 | Den Harder ......... G06K 9/3233 382/131 |

(Continued)

FOREIGN PATENT DOCUMENTS

| JP | 2004-000609 | 1/2004 |
| JP | 2014-104293 | 6/2014 |
| WO | WO 2014/084083 A1 | 6/2014 |

*Primary Examiner* — Bhavesh M Mehta
*Assistant Examiner* — Ian L Lemieux
(74) *Attorney, Agent, or Firm* — Oblon, McClelland, Maier & Neustadt, L.L.P.

(57) ABSTRACT

In one embodiment, a medical image processing apparatus includes memory circuitry configured to store a program; and processing circuitry configured, by executing the program, to set a region of interest in a medical image, set an analysis region in the region of interest by reducing the region of interest, and calculate feature amount in the analysis region.

13 Claims, 13 Drawing Sheets

(56) References Cited

U.S. PATENT DOCUMENTS

| | | | |
|---|---|---|---|
| 2012/0075638 A1* | 3/2012 | Rollins | A61B 1/00009 |
| | | | 356/479 |
| 2013/0046168 A1* | 2/2013 | Sui | A61B 5/0035 |
| | | | 600/411 |
| 2015/0221101 A1* | 8/2015 | Romanenko | G06T 7/408 |
| | | | 382/164 |
| 2015/0254826 A1 | 9/2015 | Kanda et al. | |
| 2015/0310638 A1* | 10/2015 | Jia | G06T 11/003 |
| | | | 382/131 |
| 2015/0356730 A1* | 12/2015 | Grove | G01N 23/046 |
| | | | 382/124 |
| 2015/0366500 A1 | 12/2015 | Aoyagi et al. | |
| 2016/0117797 A1* | 4/2016 | Li | G06T 3/0081 |
| | | | 382/128 |
| 2017/0193161 A1* | 7/2017 | Sapiro | G06F 17/30244 |
| 2017/0270664 A1* | 9/2017 | Hoogi | G06T 7/10 |

* cited by examiner

TEXTURE ANALYSIS RESULT

| ANALYSIS<br>ANATOMICAL<br>PORTION | UNIFORMITY OF<br>PIXEL VALUES | CONTRAST | ENTROPY |
|---|---|---|---|
| PRIMARY LESION | 0.85 | 0.24 | 1.8 |
| PHARYNX | 0.15 | 0.03 | 2.6 |
| ... | ... | ... | ... |

MEDICAL IMAGE PROCESSING APPARATUS AND ANALYSIS REGION SETTING METHOD OF TEXTURE ANALYSIS

CROSS-REFERENCE TO RELATED APPLICATION

This application is based upon and claims the benefit of priority from Japanese Patent Application No. 2016-011476, filed on Jan. 25, 2016, and Japanese Patent Application No. 2016-191730 filed on Sep. 29, 2016, the entire contents of each of which are incorporated herein by reference.

FIELD

Embodiments described herein relate generally to a medical image processing apparatus and an analysis region setting method of texture analysis.

BACKGROUND

In recent years, texture analysis in which general image pattern or image property is quantified as a function of spatial variation of pixel values in terms of image texture such as roughness, smoothness, gloss, and irregularity has been studied.

Texture analysis is one of representative analysis methods in characterization analysis, and characterization analysis includes image analysis such as histogram analysis and spectrum analysis.

Applying texture analysis to a medical image, e.g., a region of interest ROI in a tumor or an organ has been studied. Specifically, it is expected that texture analysis is effectively used for obtaining medical prediction in a target region of a medical image as well as determining whether the target region is benign or malignant. Additionally, it is known that accuracy of texture analysis is influenced when there is difference in feature between a region of interest ROI and an actual target region of a medical image to which texture analysis is applied.

However, when a user manually selects a region of interest ROI in a certain medical image, it is difficult to select this region of interest ROI in a perfectly appropriate manner. Even if a region of interest ROI is automatically selected by image analysis, it is also difficult to select this region of interest ROI in a perfectly appropriate manner because a certain degree of error may be included in the image analysis.

BRIEF DESCRIPTION OF THE DRAWINGS

In the accompanying drawings:

FIG. 7 is a schematic table illustrating how processing circuitry of the medical image processing apparatus of the first embodiment causes a display to display a texture analysis result;

DETAILED DESCRIPTION

In one embodiment, a the medical image processing apparatus includes memory circuitry configured to store a program; and processing circuitry configured, by executing the program, to set a region of interest in a medical image, set an analysis region in the region of interest by reducing the region of interest, and calculate feature amount in the analysis region.

Hereinafter, embodiments of the medical image processing apparatus will be described with reference to the accompanying drawings.

(First Embodiment)

Figure 1:
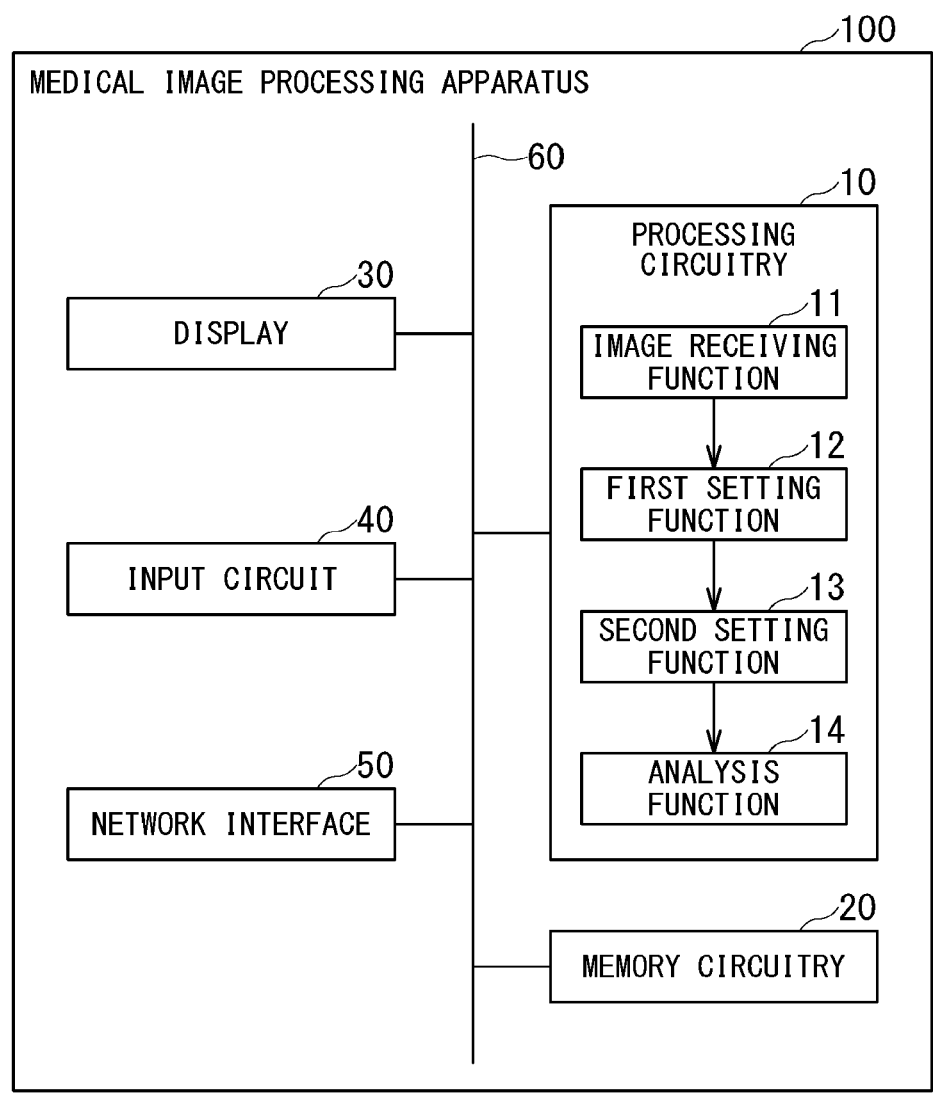
FIG. 1 is a block diagram illustrating configuration of the medical image processing apparatus of the first embodiment.

FIG. 1 is a block diagram illustrating configuration of the medical image processing apparatus 100 of the first embodiment.

As shown in FIG. 1, the medical image processing apparatus 100 includes processing circuitry 10, memory circuitry 20, a display 30, an input circuit 40, a network interface 50, and an internal bus 60.

The processing circuitry 10 is configured as a processor which implements functions corresponding to respective programs by, e.g., reading out those programs from the memory circuitry 20 and executing those programs. In other words, the processing circuitry (i.e., processor) 10 implements an image receiving function 11, a first setting function 12, a second setting function 13, and an analysis function 14 by reading out and executing the programs corresponding to these functions 11 to 14.

The image receiving function 11 is, e.g., a function of receiving input of data of a medical image such as an in-vivo image.

Data of a medical image to be inputted to the image receiving function 11 may be volume data of a three-dimensional image, image data of a two-dimensional image, and/or data of four-dimensional image depicting a dynamic state based on temporal change in a three-dimensional image.

The first setting function 12 is a function of setting a region of interest ROI in a medical image.

The second setting function 13 is a function of extracting (i.e., selecting or setting) a part of region of interest ROI excluding its outer border region as an analysis region. In other words, the second setting function 13 sets an analysis region which is reduced from the region of interest ROI.

The analysis function 14 is a function of calculating feature amount in an analysis region. For instance, the analysis function 14 can perform characterization analysis as calculation of feature amount. In the present embodiment, characterization analysis means analyzing property and state of what is depicted in an image, and includes, e.g., texture analysis, histogram analysis, spectrum analysis, and arithmetic processing of parameters such as an average value, variance, and standard deviation. Additionally, more advanced image analysis processing such as particle analysis, topological analysis, three-dimensional analysis, and four-dimensional analysis are also included in characterization analysis.

The first setting function 12 and the second setting function 13 can respectively set a region of interest ROI and an analysis region regardless of type of a medical image. For instance, in the case of a three-dimensional or four-dimensional image, a region of interest ROI and an analysis region can be appropriately set.

The memory circuitry 20 is a storage device including components such as a read only memory (ROM), a random access memory (RAM), and a hard disk drive (HDD). The memory circuitry 20 stores initial program loading (IPS), a basic input/output system (BIOS) and various types of data, and is also used as a work memory of the processing circuitry 10 and temporal storage of image data of a medical image. The HDD is a storage device configured to store data and programs (including application programs and an operating system) installed in the medical image processing apparatus 100. Additionally, the HDD can provide the operating system with a graphical user interface (GUI) whereby a user such as a surgical doctor can perform basic operations via the input circuit 40, by using many graphics for information display on the display 30.

The display 30 includes a non-illustrated image composition circuit, a video random access memory (VRAM), and a display. The image composition circuit generates composition data in which various types of text data are composed with image data, and the VRAM stores the generated composition data. The display 30 is configured of components such as a liquid crystal display and a cathode ray tube (CRT), and displays respective images indicated by image data and composition data.

The input circuit 40 is a circuit configured to receive signals from an input device such as a keyboard and a pointing device (e.g., a mouse) which a user such as a doctor and an inspection engineer can operate. In the present embodiment, the input device is assumed to be a part of the input circuit 40. In this case, input signals in accordance with a user's operation are transmitted from the input circuit 40 to the processing circuitry 10.

The network interface 50 performs communication control based on a predetermined communication standard, and has a function of being connected with an external network via, e.g., a phone line. In this manner, the network interface 50 can connect the medical image processing apparatus 100 with a network which is connected with an external modality and an external medical image storage device.

The internal bus 60 has a function of interconnecting respective components of the medical image processing apparatus 100.

The above-described term "processor" means, e.g., a circuit such as a central processing unit (CPU), a graphics processing unit (GPU), an application specific integrated circuit (ASIC), a field programmable gate array (FPGA), and a programmable logic device such as a simple programmable logic device (SPLD) and a complex programmable logic device (CPLD). Although FIG. 1 illustrates a case where the number of processors is one (i.e., the processing circuitry 10), plural processors may be included.

The processor implements respective functions by reading out programs directly installed in a circuit thereof or programs stored in a memory and executing the programs. When plural processors are provided, plural memories corresponding to respective processors may be provided or the memory circuitry 20 in FIG. 1 may collectively store respective programs corresponding to all the processors.

In order to clarify a demerit of conventional technology, a problem of a conventional setting of a region of interest ROI will be described.

In a conventional medical image processing apparatus, a region of interest ROI has been set as the same region as a target region, when measuring a volume or a shape of this target region, for example. Here, the target region means a tissue region in a body which is a target of diagnosis and/or observation.

However, it is practically difficult to extract and set a region of interest ROI completely identical with the target region as, because a manual operation inevitably involves a certain degree of error, and analysis error of a medical image processing apparatus is also included in the setting process. Thus, a region of interest ROI may become smaller than the target region in some cases or may become larger than a target region in some cases. In those cases, texture analysis is influenced depending on magnitude of the error. In particular, when a region of interest ROI is larger than a target region, it is problematic.

Examples of the conventional problems are shown in FIG. 2A to FIG. 2D. In FIG. 2A to FIG. 2D, it is illustrated how regions of interest ROI-A1, ROI-A2, ROI-A3 and ROI-A4, which respectively correspond to the target regions ZA1, ZA2, ZA3, and ZA4, are set. In each of FIG. 2A to FIG. 2D, a region to which application of texture analysis should be performed is indicated as a hatched region. Note that the hatched region corresponds to the target region.

Figure 2A:
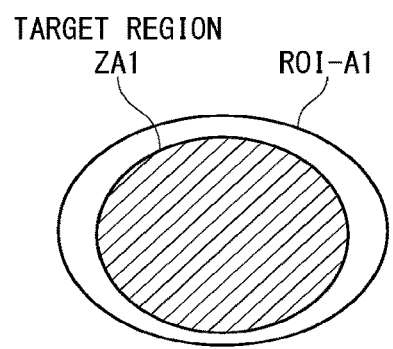
FIG. 2A to FIG. 2D are schematic diagrams illustrating how regions of interest corresponding to respective target regions are set.
Figure 2B:
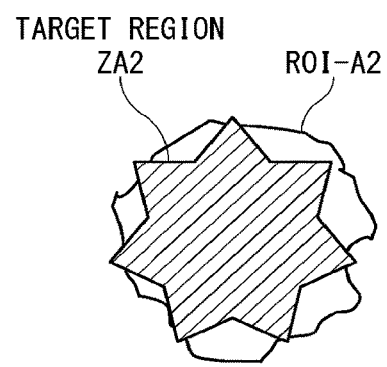
Figure 2C:
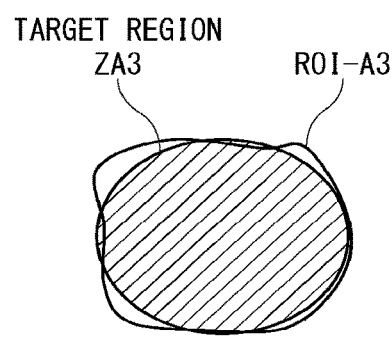
Figure 2D:
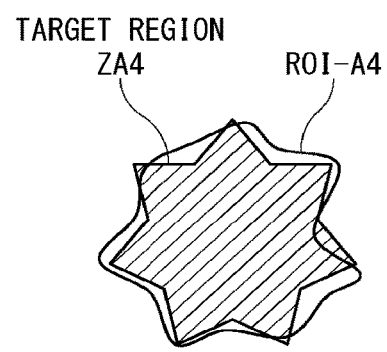

As shown in FIG. 2A, the region of interest ROI-A1 is set so as to include the entirety of the target region ZA1 in its inside. In FIG. 2B, the region of interest ROI-A2 is set so as to approximately include the target region ZA2. In FIG. 2C, the region of interest ROI-A3 is set as a region similar to the target region ZA3 in shape. In FIG. 2D, the region of interest ROI-A4 is set as a region similar to the target region ZA4 in shape.

In conventional technology, the regions of interest ROI-A1, ROI-A2, ROI-A3, and ROI-A4 in FIG. 2A to FIG. 2D are considered to be effective as a region for measuring shape of a target region such as volume and a contour for the following reason.

In the case of measuring shape, some degree of error is acceptable in some cases and a user can visually check effectiveness of an analysis result when an error is large.

However, in the case of applying texture analysis to the regions of interest ROI-A1, ROI-A2, ROI-A3, and ROI-A4, each of these four regions includes both regions to which application of texture analysis is desired and undesired, and thus, is not necessarily effective as an application region of texture analysis for the following two reasons.

Firstly, characterization analysis like texture analysis is more susceptible to an error than shape measurement, and a result of characterization analysis is greatly influenced by an error even in the case of a small error.

Secondly, even if an error included in a result of characterization analysis is large, it is difficult for a user to visually judge effectiveness of this analysis result.

For instance, in the case of FIG. 2A, existence of the approximately circular region between the target region ZA1 and the region of interest ROI-A1 (i.e., the whitely indicated region in FIG. 2A) reduces analysis accuracy inside the region of interest ROI-A1. Similarly, in the case of FIG. 2B, existence of the irregularly-shaped region between the target region ZA2 and the region of interest ROI-A2 reduces analysis accuracy inside the region of interest ROI-A2. In the case of FIG. 2C and FIG. 2D, since the regions of interest ROI-A3 and ROI-A4 include regions outside the respective target regions ZA3 and ZA4, which reduces analysis accuracy inside each of the regions of interest ROI-A3 and ROI-A4.

When a region excluding a target region of texture analysis is included in an application region of texture analysis in a conventional medical image processing apparatus, texture feature amount of such a region excluding a target region of texture analysis is undesirably included in this analysis result and accuracy of this analysis result is reduced. Although such a region excluding a target region of texture analysis may be acceptable in the case of measuring volume and a contour, appropriate texture analysis cannot be performed if such a region excluding a target region of texture analysis is included in an application region of texture analysis.

For this reason, the medical image processing apparatus 100 of the present embodiment extracts or sets only a part of a region of interest ROI as an analysis region without including an outer border region of this region of interest ROI, and applies texture analysis to this analysis region.

(Analysis-Region Setting Processing)

Figure 3:
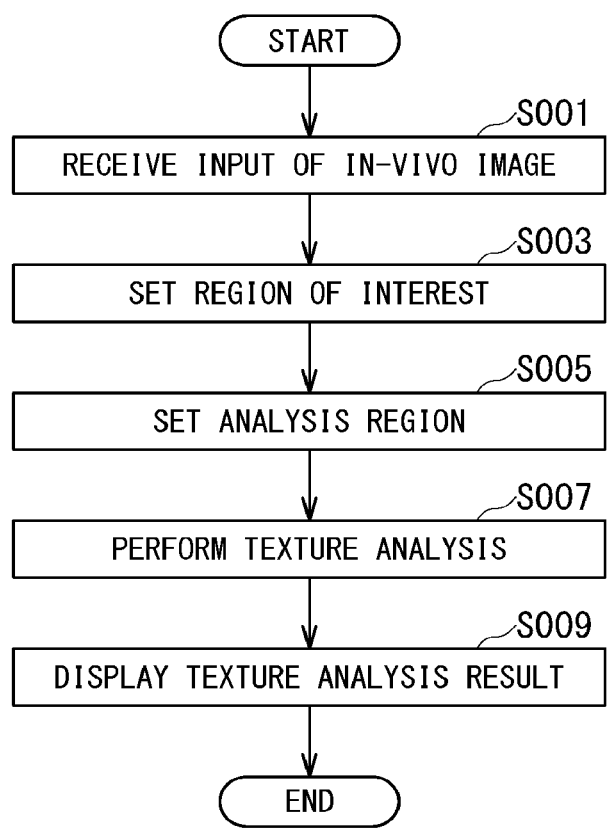
FIG. 3 is a flowchart illustrating analysis-region setting processing in which the medical image processing apparatus of the first embodiment extracts a part of a region of interest excluding its outer border region as an analysis region.

FIG. 3 is a flowchart illustrating analysis-region setting processing in which the medical image processing apparatus 100 of the first embodiment extracts a part of a region of interest ROI excluding its outer border region as an analysis region. Although texture analysis will be described as one aspect of characterization analysis in the present embodiment, the present embodiment can be applied to other types of characterization analysis.

First, a doctor operates the input circuit 40 of the medical image processing apparatus 100 so as to select a medical image to which texture analysis is applied.

In the step S001, the processing circuitry 10 of the medical image processing apparatus 100 receives input of an in-vivo image of an object (i.e., a medical image inside an object's body). Incidentally, an in-vivo image of an object to be inputted to processing circuitry 10 in this step S001 may be an in-vivo image stored in the memory circuitry 20 or an in-vivo image acquired from an external medical image diagnosis apparatus or an external medical image archive apparatus. Hereinafter, an in-vivo image inputted to the processing circuitry 10 is arbitrarily referred to as a target image.

In the step S003, the processing circuitry 10 sets a region of interest ROI in the target image inputted in the step S001.

In other words, the processing circuitry 10 extracts a region of interest ROI from image data of the target image of a patient P (i.e., an object).

Figure 4:
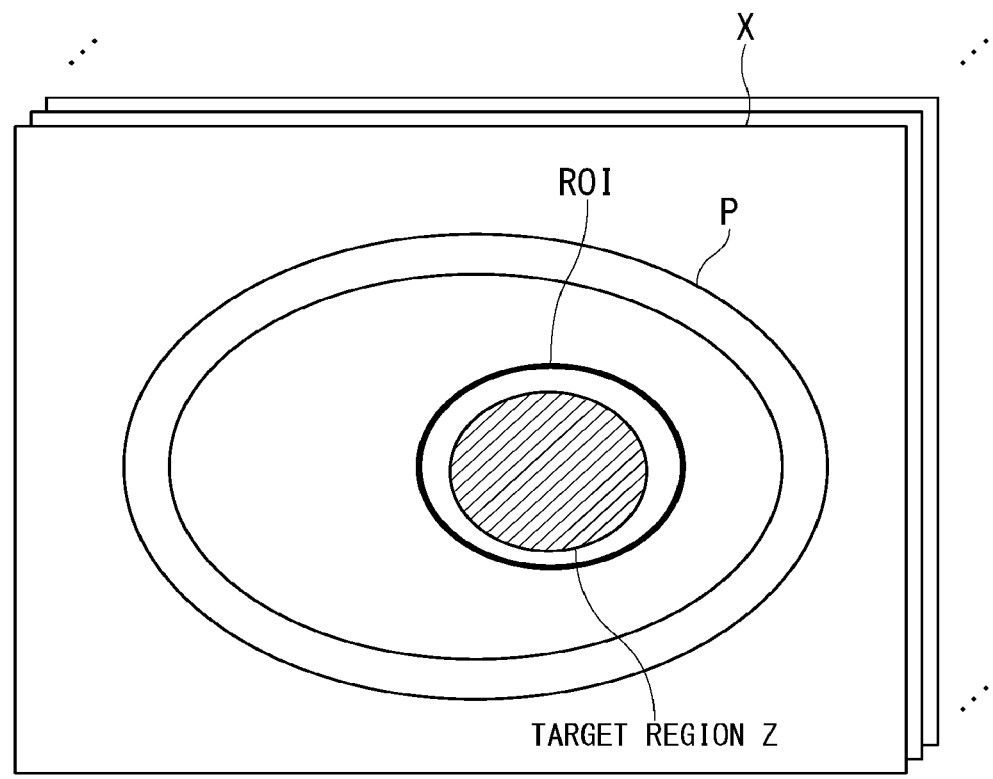
FIG. 4 is a schematic diagram illustrating a region of interest being set with respect to a target region in a target image of a patient.

FIG. 4 is a schematic diagram illustrating a region of interest ROI which is set by the medical image processing apparatus 100 of the first embodiment with respect to a target region Z in a target image X of the patient P.

As shown in FIG. 4, the processing circuitry 10 sets a region of interest ROI in the target image X of the patient P in such a manner that this region of interest ROI includes the entirety of the target region Z inside. The region of interest ROI can be acquired from accompanying information of the target image X. Even if the region of interest ROI is not included in the accompanying information of the target image X, the region of interest ROI can be automatically set with respect to the target region Z or a user such as a doctor can manually set the region of interest ROI by operating the above-described input device including a mouse.

The above-described "automatically" means that the processing circuitry 10 extracts the target region Z from a morphological image and/or a functional image and sets a region of interest ROI based on the extracted target region Z without a user's operation. In this case, depending on pixel-value distribution and shape of the target region Z, the region of interest ROI does not necessarily perfectly match the target region Z as shown in FIG. 2A to FIG. 2D.

On the other hand, "manually" means that a user such as a doctor sets a region of interest ROI by visually checking the target image X and operating the input device so as to determine a contour of the region of interest ROI. Also in this case, since setting of the region of interest ROI depends on a manual operation, the region of interest ROI does not necessarily perfectly match the target region Z.

When the target image X is based on DICOM (Digital Imaging and Communication in Medicine) standards, a region of interest ROI can be attached to the target image X.

In the step S005, the processing circuitry 10 of the medical image processing apparatus 100 extracts only a part of the region of interest ROI excluding the outer border region of the region of interest ROI so as to set the extracted part as an analysis region. In other words, the processing circuitry 10 sets an analysis region which is reduced from the region of interest ROI.

Figure 5:
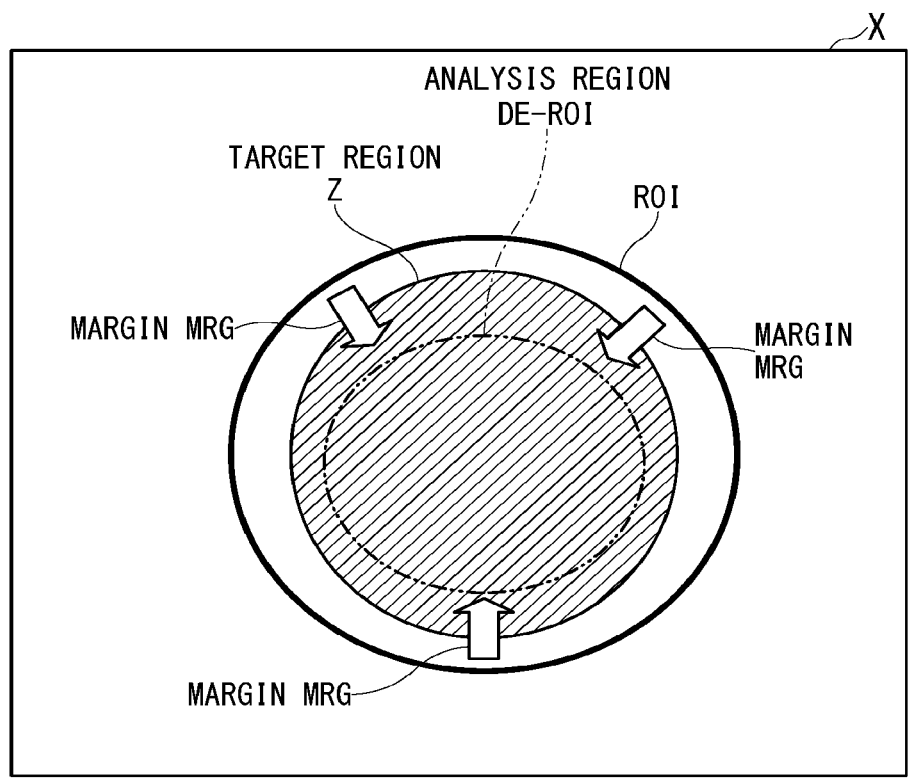
FIG. 5 is a schematic diagram illustrating how the medical image processing apparatus of the first embodiment sets an analysis region inside a region of interest without including its outer border region in a target image of a patient.

FIG. 5 is a schematic diagram illustrating how the medical image processing apparatus 100 of the first embodiment sets the analysis region DE-ROI inside the region of interest ROI, by reducing the region of interest ROI of the target region Z of the patient.

As shown in FIG. 5, the processing circuitry 101 sets the analysis region DE-ROI consisting of only the inside of the region of interest ROI.

In this case, for instance, the processing circuitry 10 may a set predetermined margin MRG between an outer border of the analysis region and an outer border of the region of interest ROI of the patient P. The predetermined margin MRG may be set as a fixed value or a variable value.

When the margin MRG is set to a fixed value, for instance, the margin MRG may be uniformly set to 2 mm. Additionally, the processing circuitry 10 may set the analysis region DE-ROI, by changing the fixed value of the margin MRG, depending on an anatomical portion of the object. For instance, the analysis region may be determined by fixedly setting the margin MRG to 2 mm in the case of a region of interest ROI for one or more lung cancer nodules and fixedly setting the margin MRG to 3 mm in the case of a region of interest ROI for one more liver cancer nodules.

Additionally, in the case of setting the margin MRG to a variable value, the analysis region DE-ROI may be set according to a predetermined ratio with respect to a region of interest ROI based on shape and an anatomical portion of this region of interest ROI. For instance, the analysis region DE-ROI may be determined by setting the margin MRG to 25% of the maximum diameter of a region of interest ROI.

Additionally, the processing circuitry 10 may set the analysis region DE-ROI based on classification of skeleton of the patient P. For instance, when the patient P belongs to the Asia-Pacific race, the processing circuitry 10 may set the margin MRG in the head-foot direction (i.e., body axis direction) to a value smaller than that of the Hispanic race and set the margin MRG in the direction orthogonal to the head-foot direction to a value larger than the that of the Hispanic race. Note that the above-described classification of skeleton is only one of possible aspects of the present embodiment and the application of the present embodiment is not limited to the above-described aspect.

Figure 6:
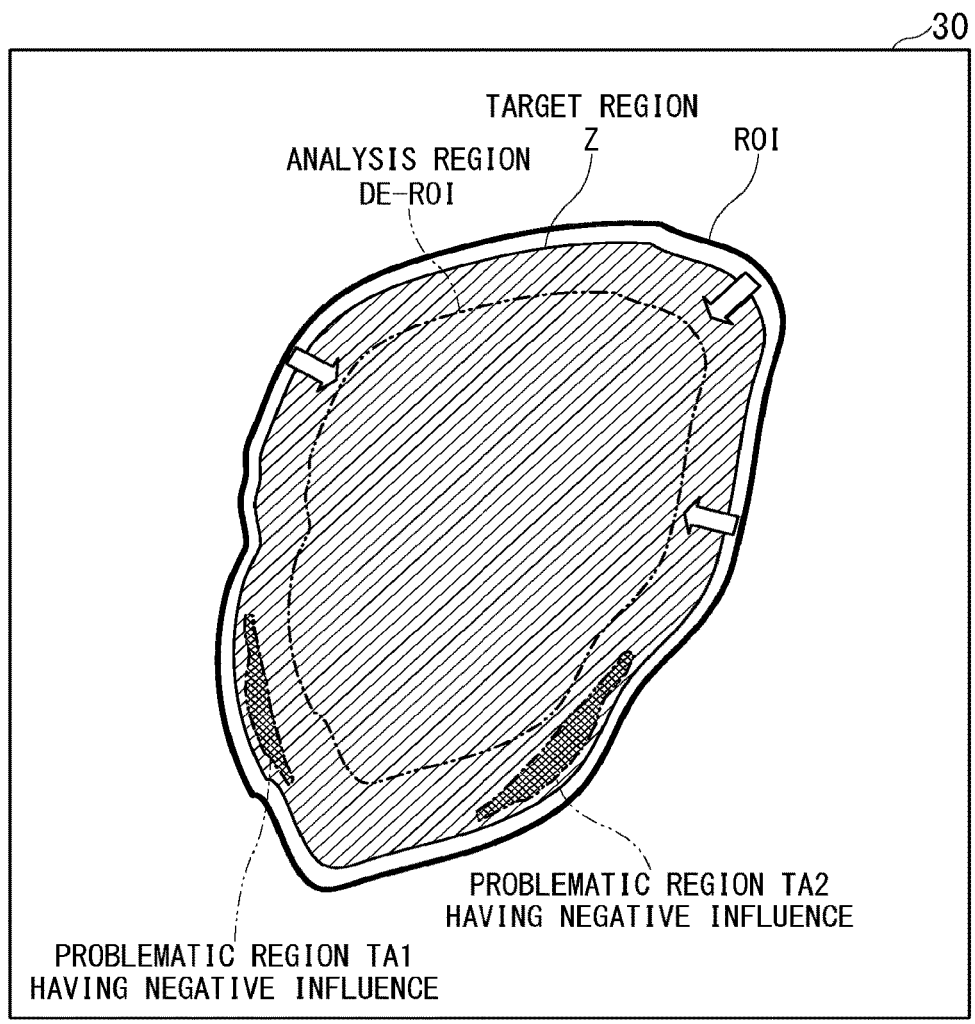
FIG. 6 is a schematic diagram illustrating an analysis region being set by the medical image processing apparatus of the first embodiment in a lung cancer image of a patient.

FIG. 6 is a schematic diagram illustrating the analysis region DE-ROI being set by the medical image processing apparatus 100 of the first embodiment in a lung cancer image of the patient P.

As shown in FIG. 6, the analysis region DE-ROI is displayed on the display 30 of the medical image processing apparatus 100, and is set as a region inside the target region Z which is inside the region of interest ROI. Additionally, problematic regions TA1 and TA2 indicate, e.g., regions having negative influence on the target region Z, and indicate regions in which CT values are relatively high.

For instance, by setting the margin MRG to a large value, the processing circuitry 10 can select the analysis region DE-ROI which does not include any part of the problematic regions TA1 and TA2 having uneven CT values and negative influence. Thus, when the texture analysis is applied to the analysis region DE-ROI selected in the above-described manner, accuracy of an analysis is not deteriorated by the problematic regions TA1 and TA2. Additionally, since the analysis region DE-ROI is selected so as not to include any part of the problematic regions TA1 and TA2, accuracy of analysis is not influenced even in the case of calculating non-uniformity by applying texture analysis to this analysis region DE-ROI.

Returning to FIG. 3, in the step S007, the processing circuitry 10 calculates feature amount in the analysis region DE-ROI. For instance, the processing circuitry 10 calculates feature amount by performing texture analysis as characterization analysis so as to acquire texture analysis information.

There are plural methods of quantifying a repetitive pattern of texture as feature amount in texture analysis, e.g., a method of quantifying frequency characteristics by applying two-dimensional Fourier transform or a method of calculating static by using a gray level co-occurrence matrix (GLCM) of pixel values. In the following, texture analysis with the use of a GLCM will be described.

For instance, the processing circuitry 10 calculates a GLCM consisting of elements each of which indicates a probability $P\delta$ (i,j) (i, j=0, 1, ... n−1) that a pixel value of a pixel, which is separated by a predetermined displacement $\delta$ (r,θ) from a pixel with pixel value i, is j, in an image A. The processing circuitry 10 calculates feature amount from this GLCM.

By using the GLCM of $P\delta$ (i,j) (i, j=0, 1, ... n−1), the processing circuitry 10 can calculate the feature amount of texture, such as contrast, correlation, energy, uniformity of pixel values, and entropy, and output a texture analysis result as an index indicative of texture analysis information.

Contrast is an index obtained by measuring local variation in a GLCM, and correlation is an index obtained by measuring co-occurrence probability of a designated pixel pair. Additionally, energy is an index as an angular secondary moment obtained by measuring sum of squares of respective elements of a GLCM. Further, uniformity of pixel values is an index obtained by measuring how much distribution of elements of a GLCM approaches a diagonal line of this GLCM.

Specifically, the processing circuitry 10 can calculate contrast as texture feature by using, e.g., the following formula (1).

$$f1 = \sum_i \sum_j (i-j)^2 P_\delta(i, j) \qquad (1)$$

Additionally, the processing circuitry 10 can calculate correlation as texture feature by using, e.g., the following formula (2).

$$f2 = \frac{1}{\sigma_x \sigma_y} \sum_i \sum_j (i-\mu_x)(j-\mu_y) P_\delta(i, j) \qquad (2)$$

Further, the processing circuitry 10 can calculate energy as texture feature by using, e.g., the following formula (3).

$$f3 = \sum_i \sum_j P_\delta(i, j)^2 \qquad (3)$$

Furthermore, the processing circuitry 10 can calculate uniformity of pixel values as texture feature by using, e.g., the following formula (4).

$$f4 = \sum_i \sum_j \frac{P_\delta(i, j)}{1 + |i - j|} \qquad (4)$$

Moreover, the processing circuitry 10 can calculate entropy as texture feature by using, e.g., the following formula (5).

$$f5 = -\sum_i \sum_j P_\delta(i, j) \log P_\delta(i, j) \qquad (5)$$

Returning to the flowchart of FIG. 3, after acquiring texture analysis information by calculating feature amount in the step S007, the processing circuitry 10 causes the display 30 to display the texture analysis result in the step S009.

FIG. 7 is a schematic table illustrating how the processing circuitry 10 causes the display 30 to display a texture analysis result.

In the table of the texture analysis result shown in FIG. 7, the leftmost of each row indicates an anatomical portion of the object, and the topmost of each column indicates a type of feature amount. For instance, a primary lesion and a pharynx are displayed as anatomical portions at the leftmost of each row. Further, uniformity of pixel values, contrast, and entropy are displayed as instances of a texture analysis result at the topmost in each of the columns.

For instance, as to uniformity of pixel values, its feature amount is 0.85 in a primary lesion and is 0.15 in a pharynx in the case of FIG. 7. As to contrast, its feature amount is 0.24 in a primary lesion and is 0.03 in a pharynx in the case of FIG. 7. As to entropy, its feature amount is 1.8 in a primary lesion and is 2.6 in a pharynx in the case of FIG. 7.

Note that uniformity of pixel values, contrast, and entropy are only instances of types or classification of texture analysis and the present embodiment is not limited to those instances.

Further, in FIG. 7, although a texture analysis result is displayed on the display 30 in the present embodiment, the present embodiment is not limited to such an aspect. In other words, it is enough that the processing circuitry 10 can calculate and output feature amount of texture in the present embodiment, and displaying the calculated feature amount of texture is not necessarily required. The texture analysis result shown in FIG. 7 is one of possible cases of displaying the calculated feature amount of texture on the display 30.

Returning to the flowchart in FIG. 3, the processing circuitry 10 calculates feature amount of texture and outputs a texture analysis result as an index indicative of texture analysis information in the step S009, and then completes the analysis-region setting processing.

As described above, the medical image processing apparatus 100 of the first embodiment sets a region of interest ROI in the target image X. The medical image processing apparatus 100 then extracts a part of the region of interest ROI excluding its outer border region, for obtaining an analysis region DE-ROI. That is, the medical image processing apparatus 100 sets the analysis region DE-ROI which is reduced from the region of interest ROI. After that, the medical image processing apparatus 100 calculates feature amount by applying texture analysis to the analysis region DE-ROI, and outputs the feature amount as the texture analysis result.

Since any region outside the target region in the target image X is not included in the analysis region DE-ROI according to the above-described setting method, the medical image processing apparatus 100 of the first embodiment can improve accuracy and robustness of texture analysis regardless of setting accuracy of the region of interest ROI.

Additionally, since the medical image processing apparatus 100 can apply texture analysis to the analysis region DE-ROI with high accuracy, degree of progression can be accurately sorted on the basis of a state of the analysis region DE-ROI in the target image X.

For instance, conditions of diffuse disease with diffuse haziness recognized in a lung cancer CT image can be sorted into seven gray-scale patterns including a normal condition pattern, and application of texture analysis can determine which pattern this diffuse disease belongs to.

For instance, according to a texture analysis result, such diffuse haziness recognized in a lung cancer CT image can be sorted into one of seven patterns including idiopathic pulmonary fibrosis (IPF), nonspecific interstitial pneumonia (NSIP), cryptogenic organizing pneumonia (COP), acute interstitial pneumonia (AIP), desquamative interstitial pneumonia (DIP), respiratory bronchiolitis-associated interstitial lung disease (RB-ILD), and lymphocytic interstitial pneumonia (LIP).

Incidentally, sorting of diffuse haziness can be interpreted as one method of determining disease name excluding a normal condition. Additionally, the medical image processing apparatus 100 may not only sort a target medical image into one of the above patterns but also set a region of interest ROI for each of lesion areas of this target medical image so as to apply texture analysis to those lesion areas.

Additionally, the medical image processing apparatus 100 can set a region of interest ROI and extract an analysis region DE-ROI inside this region of interest ROI in the case of other medical images aside from the above-described lung cancer CT image.

Figure 8:
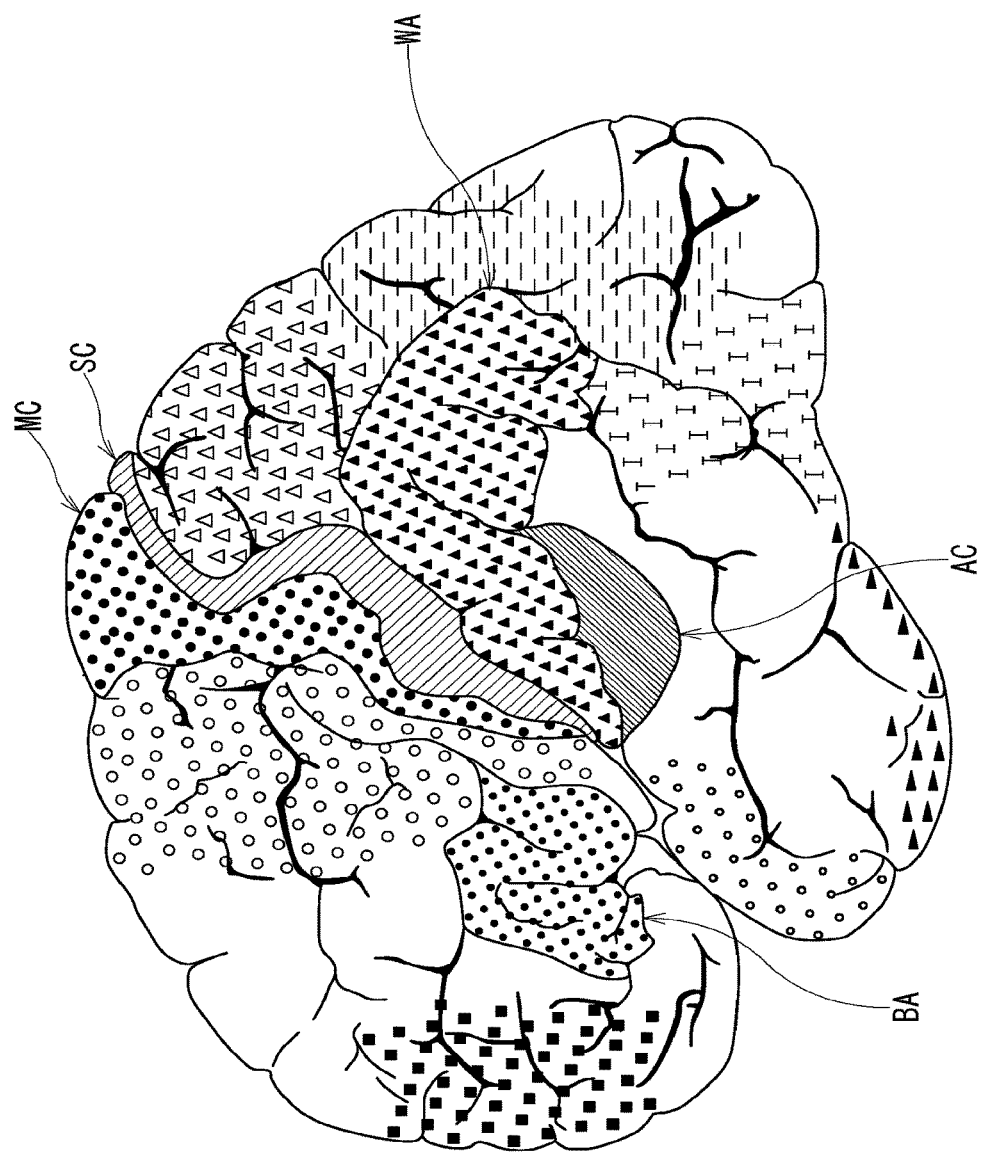
FIG. 8 is a schematic diagram illustrating a surface of a left brain segmented into respective brain-function areas to which texture analysis is separately applied.

FIG. 8 is a schematic diagram illustrating a surface of a left brain segmented into respective brain-function areas to which texture analysis is separately applied.

As shown in FIG. 8, tissue structure of a brain is different depending on its functions. For instance, it is known that cerebral cortex can be sorted into 52 areas (units) such that tissue structure is uniform in each of the 52 areas. In the case of FIG. 8, the main 5 areas out of the 52 brain function areas are illustrated.

FIG. 8 illustrates a Broca's area BA, a primary motor cortex MC, a primary somatosensory cortex SC, a Wernicke's area WA, a primary auditory cortex AC. Since each area of a brain has structure unique to itself depending on its function, 52 analysis regions DE-ROI can be set for the respective 52 brain function areas and texture analysis can be applied to the respective analysis regions DE-ROI.

In this manner, the medical image processing apparatus 100 can apply texture analysis to each of brain function areas so as to determine which brain function area is suffering from dysfunction.

Methods of setting regions of interest ROI is not limited to setting regions of interest ROI for each of brain-function areas. For instance, the medical image processing apparatus 100 can set a region of interest ROI for each node or each organ so that analysis regions DE-ROI are set inside the respective regions of interest ROI and texture analysis is separately applied to the respective analysis regions DE-ROI.

Setting a region of interest ROI for each node means, e.g., setting a region of interest ROI for each cancer by mainly targeting cancer. In this manner, the medical image processing apparatus 100 can calculate an index indicative of progression of cancer by applying texture analysis to a medical image in which cancer is recognized.

Further, setting a region of interest ROI for each organ means setting the entirety of one organ as a region of interest ROI. Furthermore, an organ means a specific tissue of a body such as a salivary gland, a prostate gland, a thyroid gland, and a lymph gland.

Although the processing circuitry 10 of the medical image processing apparatus 100 determines an analysis region DE-ROI by setting a margin MRG in the step S005 in the first embodiment, methods of determining an analysis region DE-ROI is not limited to this aspect. Three of other possible methods of determining an analysis region DE-ROI will be described as the first to third modifications as follows.

(First Modification)

The processing circuitry 10 may determine an analysis region DE-ROI by performing morphological filtering. As morphological filtering, e.g. a morphology filter can be applied or contraction processing in a morphological operation such as erosion can also be applied. The processing circuitry 10 can set an analysis region DE-ROI by arbitrarily reflecting morphological information of the region of interest ROI.

(Second Modification)

The processing circuitry 10 may calculate a centroid of a region of interest ROI and determine the analysis region based on the calculated centroid.

Figure 9:
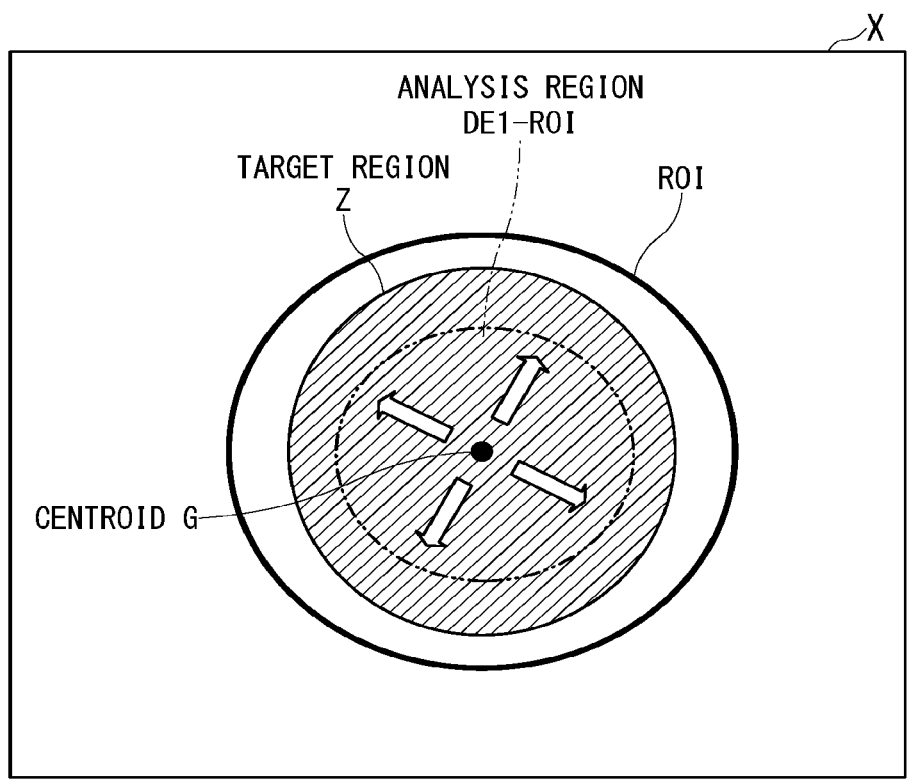
FIG. 9 is a schematic diagram illustrating how the processing circuitry sets an analysis region based on the centroid of a region of interest.

FIG. 9 is a schematic diagram illustrating how the processing circuitry 10 sets the analysis region DE1-ROI based on the centroid of a region of interest ROI.

In the case of FIG. 9, the processing circuitry 10 calculates the centroid G of the region of interest ROI which is set to include the target region Z of the target image X. Then, the processing circuitry 10 determines the analysis region DE1-ROI based on the calculated centroid G of the region of interest ROI.

Methods of calculating the centroid G is not limited to specific one but any method can be used. For instance, the processing circuitry 10 may geometrically calculate the centroid G from shape of the region of interest ROI. Additionally, the processing circuitry 10 may calculate the centroid G of the region of interest ROI by applying weighted addition to pixel values of the respective pixels of the region of interest ROI.

Meanwhile, methods of determining an analysis region DE1-ROI based on the centroid G is not also limited to specific one but any method can be used. For instance, the processing circuitry 10 may set the analysis region DE1-ROI using a circular region having a fixed radius and having a center of the centroid Gas. This fixed radius may be a predetermined ratio less than 100% (e.g., 30%, 40%) of the minimum diameter of a region of interest ROI. Additionally or alternatively, a radius of the circularly determined analysis region DE1-ROI may be a variable value determined on the basis of an anatomical site or skeleton of the patient P.

Note that, in the first embodiment, the analysis region DE-ROI is set by reducing from the region of interest ROI. By contrast, in the second modification, the analysis region DE1-ROI is set by enlarging a small region having the centroid G toward the outer border of the region of interest ROI. In both cases, a predetermined margin between the outer borders of the region of interest ROI and the analysis region DE1-ROI is secured.

(Third Modification)

The processing circuitry 10 may set a grid pattern (lattice) on a region of interest ROI and determine an analysis region based on the grid pattern.

Figure 10:
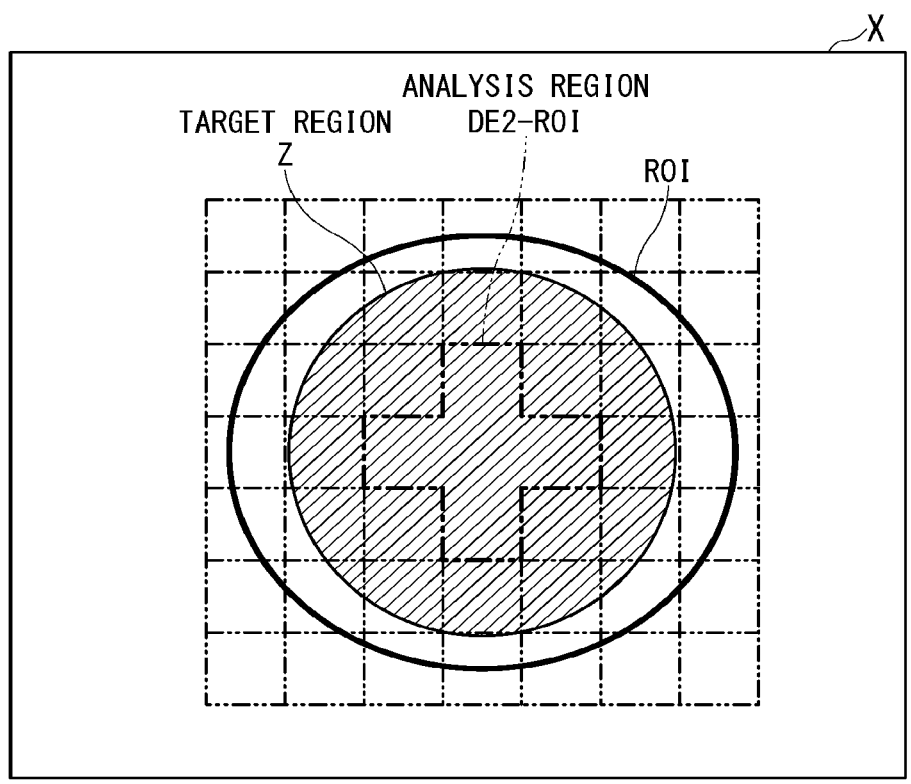
FIG. 10 is a schematic diagram illustrating how the processing circuitry sets a grid pattern on a region of interest and determines an analysis region in a target region based on the grid pattern.

FIG. 10 is a schematic diagram illustrating how the processing circuitry 10 sets a grid pattern on the region of interest ROI and determines the analysis region DE2-ROI in the target region Z based on the grid pattern.

In the case of FIG. 10, the processing circuitry 10 sets a grid pattern in the target region Z of target image X. Then, the processing circuitry 10 determines the analysis region DE2-ROI inside the target region Z based on this grid pattern.

For instance, the processing circuitry 10 sets a grid pattern consisting of multiple units such as squares, rectangles, and hexagons, and determines the analysis region DE2-ROI by selecting specific units. In this case, the processing circuitry 10 may set the analysis region DE2-ROI by selecting a fixed number of units (e.g., by selecting 10 units around the center of the target region Z).

Additionally or alternatively, the processing circuitry 10 may set the analysis region DE2-ROI by selecting variable number of units such that size of the selected units becomes predetermined size or the selected units approximately forms a predetermined geometric shape such as a regular polygon.

(Fourth Modification)

In the fourth modification, a user such as a doctor can set an analysis region DE-ROI based on a region of interest ROI observing the screen of the display 30 in addition to configuration of the first embodiment. In this case, the medical image processing apparatus 100 causes the display 30 to display a setting screen for an analysis region DE-ROI, and the processing circuitry 10 receives setting of an analysis region DE-ROI selected by a user's operation on the input circuit 40.

Figure 11:
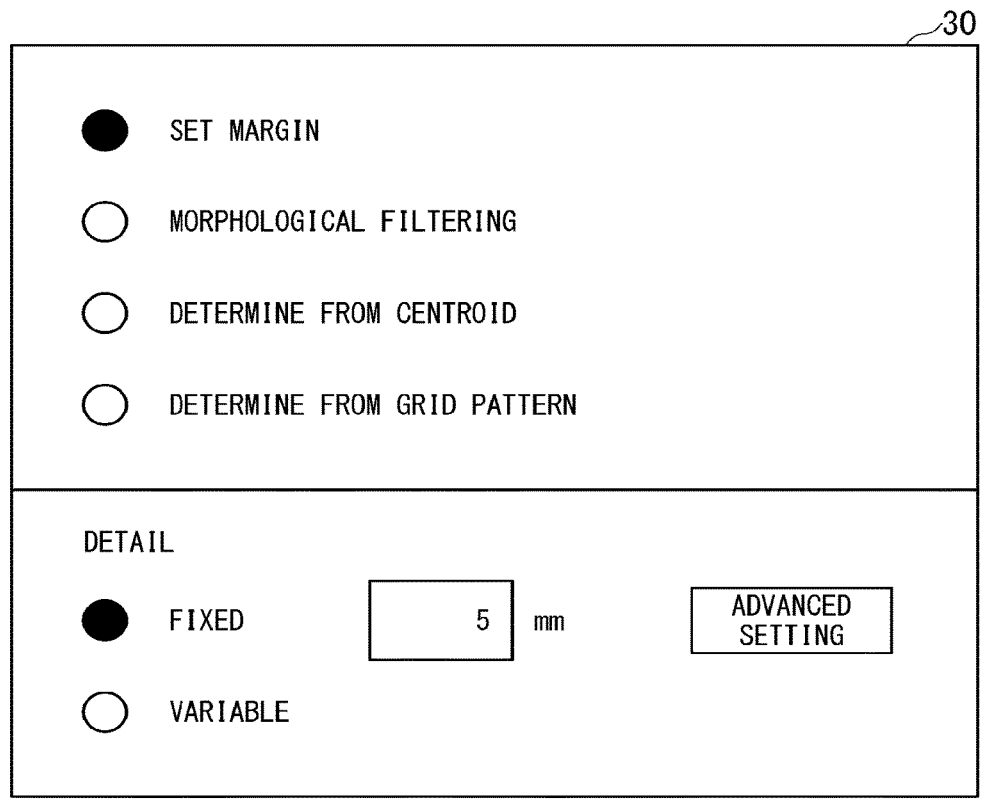
FIG. 11 is a schematic diagram illustrating a setting screen displayed on the display when the medical image processing apparatus sets an analysis region.

FIG. 11 is a schematic diagram illustrating a setting screen displayed on the display 30 when the medical image processing apparatus 100 sets an analysis region DE-ROI.

In the case of FIG. 11, the display 30 displays a setting screen such that the four methods of setting an analysis region DE-ROI described as the first embodiment and the first to third modifications are selectable and a value of a margin MRG in the case of selecting the first embodiment is also selectable.

For instance, a user can set the analysis region DE-ROI described in the first embodiment as a region of interest ROI by operating the input circuit 40 such as a mouse and a keyboard on the display 30. As described above, since the display 30 displays a setting screen such that a user can select one of the methods of setting an analysis region DE-ROI by operating the input circuit 40, the processing circuitry 10 can determine an analysis region DE-ROI by using the method selected by the user.

(Second Embodiment)

Although the processing circuitry 10 of the medical image processing apparatus 100 sets an analysis region DE-ROI in the step S005 and then performs texture analysis in the step S007 in the first embodiment, embodiments of the present disclosure is not limited to such order.

For instance, the processing circuitry 10 may set a margin MRG indicative of predetermined difference between a region of interest ROI of the patient P and an analysis region DE-ROI and then determine whether the margin MRG between this region of interest ROI and the analysis region DE-ROI is appropriate or not. When the margin MRG is determined to be inappropriate in this case, the processing circuitry 10 can set the analysis region DE-ROI again.

Figure 12:
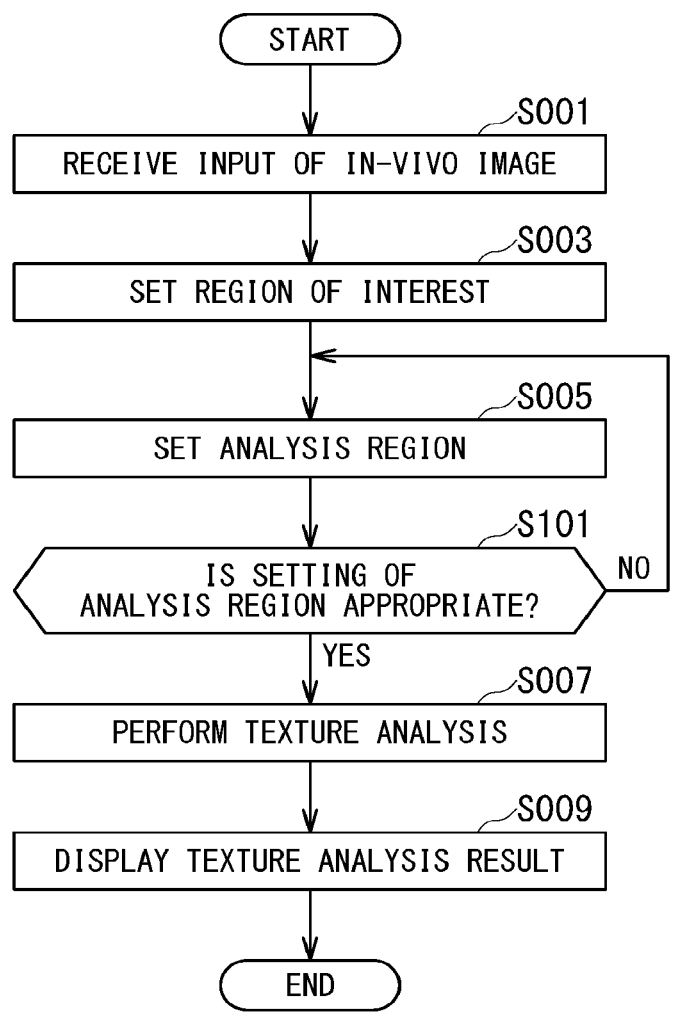
FIG. 12 is a flowchart illustrating an operation performed by the medical image processing apparatus of the second embodiment in which determination processing as to whether setting of an analysis region is appropriate or not is added after the step S005.

FIG. 12 is a flowchart illustrating an operation performed by the medical image processing apparatus 100 of the second embodiment in which determination processing as to whether setting of analysis region DE-ROI is appropriate or not is added after the step S005.

The difference between the flowchart of the second embodiment shown in FIG. 12 and the flowchart of the first embodiment shown in FIG. 3 is that processing of the step S101 is added immediately after the processing of the step S005. Since the flowchart shown in FIG. 12 is the same as the flowchart shown in FIG. 3 except the step S101, only the step S101 will be described.

In the second embodiment, the processing circuitry 10 is configured to determine whether an analysis region DE-ROI provisionally set in the step S005 is appropriate or not in the step S101 immediately after the processing of the step S005. For instance, the processing circuitry 10 determines whether a margin MRG having been set on the region of interest ROI is appropriate or not. When the margin MRG is determined to be inappropriate in the step S101, the processing circuitry 10 returns the processing to the step S005 and sets an analysis region DE-ROI again.

As to methods of determining whether a margin MRG is appropriate or not performed by the processing circuitry 10, for instance, at least three methods described below are included. Although descriptions shown below will be given for cases where determination is performed by using CT values of respective pixels in a CT image (e.g., by using a pixel value of one pixel or an average pixel value of a predetermined region in a CT image), such determination of appropriateness of a margin MRG is not limited to methods using CT values. For instance, whether a margin MRG is appropriate or not may be determined by using pixel values of a diagnosis image imaged by modalities other than an X-ray CT apparatus.

In the first method, the processing circuitry 10 determines whether a margin MRG satisfies a predetermined threshold value condition or not. When this margin MRG satisfies the threshold value condition, the processing circuitry 10 determines this margin MRG to be appropriate. Conversely, when this margin MRG does not satisfy the threshold value condition, the processing circuitry 10 determines this margin MRG to be inappropriate and sets the analysis region DE-ROI again.

In the second method, the processing circuitry 10 determines whether difference in CT value between the analysis region DE-ROI and its surrounding region obtained by simply excluding the analysis region DE-ROI from the region of interest ROI satisfies a condition of a predetermined difference threshold value or not. The above-described difference in CT value may be difference in the average CT value or difference in CT value of a representative pixel, for instance. When the condition of the predetermined difference threshold value is satisfied, the processing circuitry 10 determines this margin MRG to be appropriate. Conversely, when the condition of the predetermined difference threshold value is not satisfied, the processing circuitry 10 determines this margin MRG to be inappropriate and sets the analysis region DE-ROI again.

In the third method, the processing circuitry 10 locally applies texture analysis to an analysis region DE-ROI so as to obtain feature amount as its analysis result. When the analysis result satisfies a condition of a predetermined index value, the processing circuitry 10 determines this margin MRG to be appropriate. Conversely, when the analysis result does not satisfy the condition of the predetermined index value, the processing circuitry 10 determines this margin MRG to be inappropriate and sets the analysis region DE-ROI again.

Figure 13A:
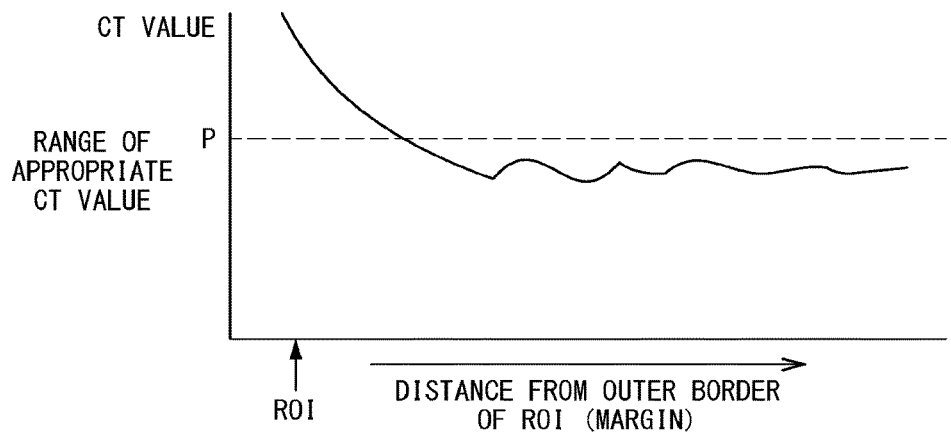
FIG. 13A to FIG. 13C are schematic diagrams illustrating the first to third methods of determining appropriateness of a margin used for determining an analysis region performed by the processing circuitry of the medical image processing apparatus in the second embodiment.
Figure 13B:
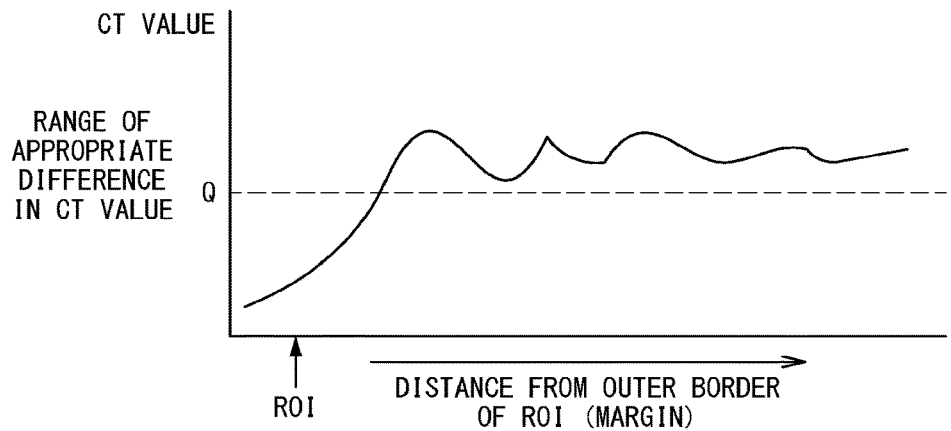
Figure 13C:
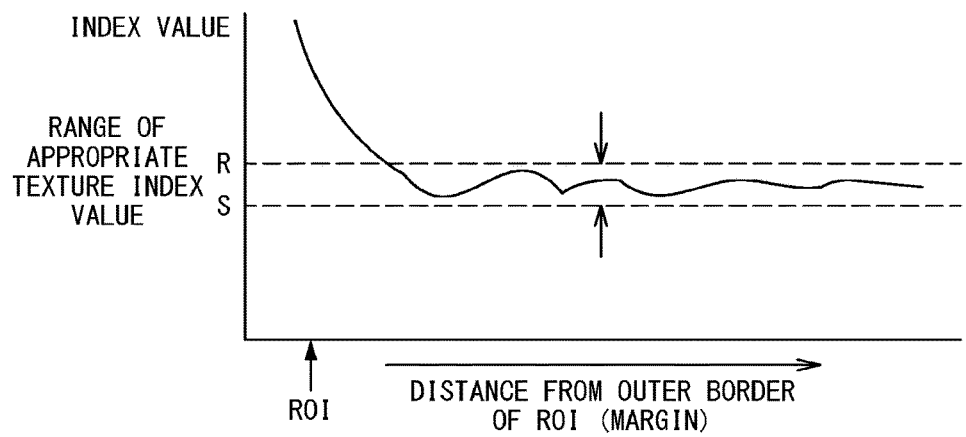

FIG. 13A to FIG. 13C are schematic diagrams illustrating the first to third methods of determining appropriateness of a margin MRG used for determining an analysis region DE-ROI performed by the processing circuitry 10 of the medical image processing apparatus 100 in the second embodiment.

FIG. 13A illustrates t the first method, FIG. 13B illustrates the second method, and FIG. 13C illustrates the third method.

In the first method shown in FIG. 13A, for instance, a CT value equal to or smaller than 700 (indicated by P in the vertical axis) is used as the predetermined threshold value. When the average CT value (or a CT value of at least one pixel) in the analysis region DE-ROI determined by the margin MRG exceeds 700, this margin MRG does not satisfy the condition of the predetermined threshold value and the processing circuitry 10 determines this margin MRG to be inappropriate.

In this case, the processing circuitry 10 sets the analysis region DE-ROI again in such a manner that the average CT value of the analysis region DE-ROI to be set again becomes equal to or less than 700. Specifically, the processing circuitry 10 sets the margin MRG again in such a manner that the analysis region DE-ROI becomes smaller in size (i.e., the margin MRG to be set again becomes larger than the margin MRG determined to be inappropriate).

In the second method FIG. 13B, for instance, a CT value equal to or larger than 200 (indicated by Q in the vertical axis) is used as the predetermined difference threshold value. When difference in CT value (e.g., average CT value or CT value of at least one representative pixel) between the analysis region DE-ROI determined by the margin MRG and its peripheral region obtained by simply excluding this analysis region DE-ROI from the region of interest ROI is smaller than 200, this margin MRG does not satisfy the condition of the predetermined difference threshold value and the processing circuitry 10 determines this margin MRG to be inappropriate.

In this case, the processing circuitry 10 sets the margin MRG again in such a manner that difference in CT value between the analysis region DE-ROI to be newly defined by the margin MRG being set again and its peripheral region obtained by simply excluding the newly defined analysis region DE-ROI from the region of interest ROI becomes equal to or larger than 200. Specifically, the processing circuitry 10 sets the margin MRG again in such a manner that the analysis region DE-ROI becomes smaller in size (i.e., the margin MRG to be set again becomes larger than the margin MRG determined to be inappropriate).

In the third method shown in FIG. 13C, for instance, a value range from 0.4 to 0.6 (indicated by the range between R and S in the vertical axis) is set as a satisfactory range of an index value of predetermined texture analysis result. Next, the processing circuitry 10 locally applies texture analysis to the analysis region DE-ROI defined by the margin MRG. When the index value of this texture analysis result is out of the range between R and S, this texture analysis result is considered to be unreliable and this margin MRG does not satisfy the condition of the predetermined range of an index value. In this case, the processing circuitry 10 determines this margin MRG to be inappropriate and sets the analysis region DE-ROI again.

Specifically, the processing circuitry 10 sets the margin MRG again in such a manner that the new margin MRG becomes sufficiently larger than the margin MRG determined to be inappropriate and a result of local texture analysis applied to the analysis region DE-ROI defined by this new margin MRG falls in the satisfactory range (between R and S in the case of FIG. 13C). Note that the analysis region DE-ROI defined by this new margin MRG becomes smaller in size.

Incidentally, the processing circuitry 10 may determine appropriateness of the margin MRG based on change in analysis result obtained by applying local texture analysis to plural spots of the analysis region DE-ROI defined by this margin MRG.

In this case, the processing circuitry 10 determines the margin MRG to be appropriate when there is not extreme difference between texture analysis results of the respective spots.

Additionally, resetting of the analysis region DE-ROI in the second embodiment is not limited to cases where the analysis region DE-ROI having been provisionally set is too large in size and is set again so as to become smaller. For instance, technology of the second embodiment can be applied to a case where the analysis region DE-ROI having been provisionally set is too small in size and is set again to become larger.

According to at least one of the above-described embodiments, the medical image processing apparatus 100 can improve accuracy and robustness of characterization analysis regardless of setting accuracy of a region of interest.

While certain embodiments have been described, these embodiments have been presented by way of example only, and are not intended to limit the scope of the inventions.

Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A medical insane analysis apparatus, comprising:
memory circuitry configured to store a program; and
processing circuitry configured to, by executing the program,
set a region of interest in a medical image,
set an analysis region in the region of interest by reducing the region of interest,
set a predetermined margin between the region of interest and the analysis region,
apply local texture anal analysis to plural spots set in the analysis region defined by the predetermined margin,
determine whether the predetermined margin is appropriate or not, based on differences in index values obtained by the texture analysis applied to the plural spots,
reduce the analysis region when the predetermined margin is not determined to be appropriate, while maintaining the analysis region when the predetermined margin is determined to be appropriate, and
calculate a feature amount in the analysis region that has been reduced or maintained.

2. The medical image processing apparatus according to claim 1,
wherein the processing circuitry is further configured to calculate the feature amount by performing characterization analysis in the analysis region.

3. The medical image processing apparatus according to claim 2,
wherein the processing circuitry is further configured to perform the characterization analysis by performing texture analysis to obtain texture analysis information.

4. The medical image processing apparatus according to claim 1, wherein the processing circuitry is further configured to
set the analysis region again when the predetermined margin is determined to be inappropriate.

5. The medical image processing apparatus according to claim 1, wherein the processing circuitry is further configured to set the analysis region by performing morphological filtering on the region of interest.

6. The medical image processing apparatus according to claim 1, wherein the processing circuitry is further configured to calculate a centroid of the region of interest and set the analysis region based on the calculated centroid.

7. The medical image processing apparatus according to claim 1, wherein the processing circuitry is further configured to
set a grid pattern consisting of plural units on the region of interest, and
set the analysis region by selecting units such that selected units forms a predetermined shape.

8. The medical image processing apparatus according to claim 1, wherein the processing circuitry is further configured to set the analysis region based on an anatomical portion of the region of interest or a skeleton of a patient depicted in the medical image.

9. The medical image processing apparatus according to claim 1, wherein the processing circuitry is further configured to set the region of interest for each of a plurality of lesion areas.

10. The medical image processing apparatus according to claim 1, wherein the processing circuitry is further configured to set the region of interest for each of a plurality of brain function areas obtained by sorting an entirety of a brain into plural areas in terms of function.

11. The medical image processing apparatus according to claim 1, wherein the processing circuitry is further configured to set the region of interest for each node.

12. The medical image processing apparatus according to claim 1, wherein the processing circuitry is further configured to set the region of interest for each body tissue by setting an entirety of one body tissue as the region of interest.

13. An analysis region setting method of texture analysis, comprising:
setting a region of interest in a medical image;
setting an analysis region in the region of interest, by reducing the region of interest;
setting a predetermined margin between the region of interest and the analysis region;
applying local texture analysis to plural spots set in the analysis region defined by the predetermined margin;
determining whether the predetermined margin is appropriate or not, based on differences in index values obtained by the texture analysis applied to the plural spots;
reducing the analysis region when the predetermined margin is not determined to be appropriate, while maintaining the analysis region when the predetermined margin is determined to be appropriate; and
calculating feature amount in the analysis region that has been reduced or maintained.

* * * * *